United States Patent Office 2,969,351
Patented Jan. 24, 1961

2,969,351

NEW METALLIFEROUS ORTHO:ORTHO'-DIHY-DROXY-MONOAZO-DYESTUFFS

Hans Grossmann, Basel, Switzerland, assignor to Durand & Huguenin A.G., Basel, Switzerland, a company of Switzerland No Drawing. Filed Mar. 10, 1958, Ser. No. 720,005

Claims priority, application Switzerland Mar. 11, 1957

7 Claims. (Cl. 260—149)

This invention provides valuable new complex metal compounds of ortho:ortho'-dihydroxy-monoazo-dyestuffs of the general Formula I

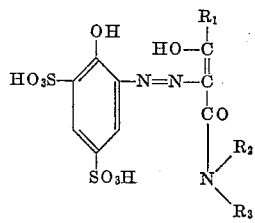

in which $R_1$ represents a methyl, phenyl or diphenyl group, $R_2$ represents a hydrogen atom or a lower alkyl group or a phenyl group, and $R_3$ represents a hydrogen atom or a lower alkyl, cyclo-hexyl, benzyl, phenyl, or naphthyl group, and the groups $R_1$, $R_2$ and $R_3$ are free from sulphonic acid groups, and in which complex metal compounds the metal bound in complex union has an atomic weight of at least 55 and at most 64.

The invention also provides a process for the manufacture of the above new complex metal compounds, wherein a monoazo-dyestuff of the above general Formula I is treated with an agent yielding a metal having an atomic weight of at least 55 and at most 64.

The ortho:ortho'-dihydroxy-monoazo-dyestuffs of the general Formula I, which are used as starting materials in the above process can be made by methods in themselves known by coupling diazotised 1-amino-2-hydroxy-benzene-3:5-disulphonic acid advantageously in an alkaline medium with an acylacetic acid amide of the general formula

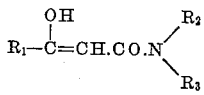

in which $R_1$, $R_2$ and $R_3$ have the meanings given above.

The acyl acetic acid amides used as coupling components for making the monoazo-dyestuffs may contain an aliphatic or aromatic acyl group, for example, an acetyl group or a benzoyl or phenylbenzoyl group, which is free from salt-forming substitutents. The acylacetic acid amides may be prepared from acylacetic acid esters, for example, by heating the ester in an inert solvent with the desired amine free from sulphonic acid groups.

An especially simple method for making the acylacetic acid amides is to react the amino compound with diketene.

Especially suitable coupling components for use as starting materials for making the ortho:ortho'-dihydroxy-monoazo-dyestuffs are acetoacetic acid amide, acetoacetic acid -N-methylamide, -N-ethylamide, -N-butylamide, -N-hexylamide, -N-dimethylamide and -N-dibutylamide, acetoacetic acid morpholide, acetoacetic acid benzylamide, acetoacetic acid cyclohexylamide, benzoylacetic acid-2:5-dichloranilide, phenylbenzoylacetic acid naphthyl-(2)-amide, acetoacetylamino-benzene, acetoacetyl-N-methylamino-benzene, 1-acetoacetylamino-2- or -3- or -4-chlorobenzene, 1-acetoacetylamino-2:5-dichlorobenzene, -2- or -3- or -4-methylbenzene, -2- or -4-methoxybenzene, -2:4- or -2:5-dimethoxybenzene, -2:4-dimethylbenzene, -3- or -4-carboxybenzene, -4-nitrobenzene, -4-oxy-3-carboxybenzene and 1- or 2-acetoacetylamino-naphthalene.

The conversion of the ortho:ortho'-dihydroxy-monoazo-dyestuff so obtained into its complex metal compound may be carried out by using as starting material the crude isolated dyestuff or the purified dyestuff. It is of considerable advantage to use the filter cake without drying it. In many cases the formation of the complex metal compound can be carried out directly in the coupling mixture, that is to say, without first isolating the dyestuff.

As agents yielding metal there are preferably used simple metal salts, for example, copper acetate, copper sulphate, cobalt acetate, cobalt sulphate, nickel acetate, nickel sulphate, or iron sulphate. There may also be used complex metal compounds, for example, copper tetrammine sulphate, or complex metal compounds of alkali metal salts of aliphatic amino-carboxylic acids, or aliphatic hydroxy-carboxylic acids, for example, sodium copper tartrate.

The metallisation of the ortho:ortho'-dihydroxy-azo-dyestuffs may be carried out in a weakly acid, neutral or weakly alkaline medium, and it is preferable to use a metal compound which is soluble at the pH value at which the metallisation is carried out. Thus, for example, copper sulphate, cobalt acetate, nickel acetate or iron sulphate may be used with acid pH values, and copper tetrammine sulphate or sodium copper tartrate may be used with alkaline pH values.

It is very advantageous to produce the complex metal compounds of the ortho:ortho'-dihydroxy-azo-dyestuffs of the Formula I with the use of the theoretical quantity of copper sulphate, cobalt sulphate, nickel sulphate or iron sulphate in a solution buffered with sodium acetate at 80–90° C., but the invention is in no way limited to this preferred temperature range. A reaction period of ½ to 2 hours usually suffices.

The metalliferous ortho:ortho'-dihydroxy-monoazo-dyestuffs are worked up in known manner, for example, by salting out.

The valuable new dyestuffs so obtained are metal compounds which contain the metal in complex union with the ortho:ortho'-dihydroxy-monoazo-dyestuffs of the Formula I.

The complex metal compounds of this invention are dyestuffs which are especially suitable for dyeing anodically oxidised aluminium. The pure yellow dyeings so produced on anodically oxidised aluminium are distinguished by their very good and in some cases excellent properties of fastness to light and climatic conditions. They are also excellently suited for admixture with other dyestuffs suitable for dyeing aluminium. Thus, for example, a very wide variety of green tints of very high clarity are produced with mixtures of the dyestuffs of this invention with blue-dyeing dyestuffs suitable for dyeing aluminium.

The following examples illustrate the invention, the parts being by weight.

Example 1

38.1 parts of the dyestuff from diazotised 1-amino-2-hydroxybenzene-3:5-disulphonic acid and acetoacetic acid N-dimethylamide of the formula

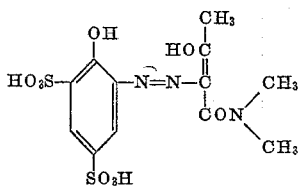

are dissolved in the form of the sodium salt in 250 parts of water at the boil under reflux. To the resulting solution there is added dropwise, while stirring, an acetic acid solution of 21 parts of crystalline copper acetate in 200 parts of water, and the whole is stirred at the boil until the formation of the complex is complete. The dyestuff is isolated by salting out with sodium chloride, drying it in vacuo and grinding.

The dyestuff so obtained is a yellow-brown powder which dissolves in water and in concentrated sulphuric acid to give a yellow colouration, and yields anodically oxidised aluminium greenish yellow dyeings that are very fast to light.

The new dyestuff may be used for dyeing anodized aluminium in the following manner:

A defatted piece of aluminium is anodically oxidized in the usual manner in sulphuric acid of 20% strength at a current density of 1.5 amperes per square decimetre for 30 minutes to form an oxide, coating it about 10 microns thick, and after being rinsed the aluminium is dyed for 15 minutes at 60° C. in a dyebath containing 1 gram of the dyestuff per litre. After rinsing the aluminium and subjecting it to "sealing" for 20 minutes in boiling water, there is obtained a pure greenish yellow dyeing of excellent fastness to light.

Dyestuffs having similar properties are obtained by using in this example, instead of acetoacetic acid N-dimethylamide, acetoacetic acid amide, acetoacetic acid methylamide, acetoacetic acid ethylamide, acetoacetic acid n-hexylamide or acetoacetic acid cyclohexylamide.

Example 2

350 parts of an acetic acid solution containing sodium acetate and 45.7 parts of the dyestuff of the formula

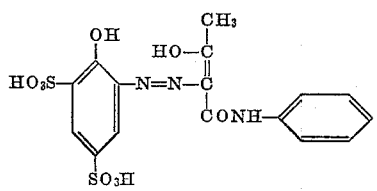

(which has been obtained directly by coupling diazotised 1-amino-2-hydroxybenzene-3:5-disulphonic acid with acetoacetylaminobenzene) are heated to 75–80° C. There are then added in small portions, while stirring, 27 parts of finely ground copper sulphate ($CuSO_4 + 5H_2O$), and the whole is stirred for 1 hour at 75–80° C. By the addition of 75 parts of sodium chloride the complex copper compound so formed is precipitated, and it is then filtered off, if desired, reprecipitated, and dried and ground.

The dyestuff so obtained is a yellow-brown powder which dissolves in water and in concentrated sulphuric acid to give a yellow colouration. When used for dyeing anodically oxidized aluminium, it yields a pure yellow tint which is very fast to light.

By using in this example, instead of copper sulphate, a corresponding quantity of cobalt sulphate, nickel sulphate, or ferrous sulphate, there are obtained dyestuffs having similar dyeing properties.

In the above example the same good result is obtained by using 1-acetoacetylamino-2- or -3- or -4-chlorobenzene instead of acetoacetylaminobenzene.

Example 3

94.2 parts of the dyestuff obtained from diazotised 1-amino-2-hydroxybenzene-3:5-disulphonic acid and 1-acetoacetylamino-4-methyl-benzene are dissolved at the boil under reflux in 600 parts of water. 150 parts of an ammoniacal solution of copper sulphate containing 13 parts of copper are introduced dropwise in the course of 30 minutes. The complex copper compound precipitates out almost quantitatively and, after boiling for one hour, is filtered off, dried and ground.

The dyestuff so obtained is a yellow-brown powder which dissolves in water and in concentrated sulphuric acid to give a yellow coloration. From a bath having a pH value of 5 the dyestuff dyes anodically oxidised aluminium pure yellow tints of excellent fastness to light.

Instead of the copper tetrammine solution, there may be used an alkaline solution of sodium copper tartrate containing the same quantity of copper.

By using, instead of 1-acetoacetylamino-4-methylbenzene, 1-acetoacetylamino-2-methylbenzene or -3-methylbenzene or -2:4-dimethylbenzene, dyestuffs having similar properties are obtained.

Example 4

11.8 parts of the dyestuff obtained from diazotised 1-amino-2-hydroxybenzene-3:5-disulphonic acid and benzoylacetic acid-2:5-dichloranilide are dissolved as the sodium salt in the necessary quantity of boiling water. To the solution are added dropwise, while stirring, 50 parts of a solution of copper acetate containing 1.3 parts of copper, and the whole is stirred until the formation of the complex is complete. The dyestuff is isolated by salting out with sodium chloride, dried and ground.

The dyestuff so obtained is a yellow-brown powder which dissolves in water and in concentrated sulphuric acid with a yellow coloration and dyes anodically oxidised aluminium yellow tints that are very fast to light.

In the following table are given further examples of dyestuffs prepared by the processes described in Examples 1–4.

| Example | ortho:ortho'-dihydroxy-monoazo-dyestuff from diazotised 1-amino-2-hydroxybenzene-3:5-disulphonic acid | Metal | Tint on anodically oxidised aluminium |
|---|---|---|---|
| 5 | 1-acetoacetylamino-3-chlorobenzene | Co | Yellow. |
| 6 | ----do---- | Ni | Do. |
| 7 | 1-acetoacetylamino-4-chlorobenzene | Co | Do. |
| 8 | ----do---- | Ni | Do. |
| 9 | ----do---- | Fe | Do. |
| 10 | 1-acetoacetylamino-2-methylbenzene | Ni | Do. |
| 11 | ----do---- | Co | Do. |
| 12 | 1-acetoacetylamino-2:4-dimethylbenzene | Co | Do. |
| 13 | ----do---- | Ni | Do. |
| 14 | 1-acetoacetylamino-2-methoxybenzene | Cu | Do. |
| 15 | ----do---- | Co | Do. |
| 16 | ----do---- | Ni | Do. |
| 17 | 1-acetoacetylamino-2:4-dimethoxybenzene | Cu | Do. |
| 18 | 1-acetoacetylamino-2:5-dimethoxybenzene | Cu | Do. |
| 19 | ----do---- | Co | Do. |
| 20 | ----do---- | Ni | Do. |
| 21 | 1-acetoacetylamino-4-nitrobenzene | Cu | Do. |
| 22 | ----do---- | Co | Do. |
| 23 | ----do---- | Ni | Do. |
| 24 | 1-acetoacetylamino-3-carboxybenzene | Cu | Do. |
| 25 | 1-acetoacetylamino-4-carboxybenzene | Cu | Do. |
| 26 | 1-acetoacetylamino-4-oxy-3-carboxybenzene | Cu | Do. |
| 27 | 1-acetoacetylamino-2-methoxy-5-methylbenzene | Cu | Do. |
| 28 | acetoacetyl-N-methylaminobenzene | Cu | Do. |
| 29 | Acetoacetic acid benzylamide | Cu | Do. |
| 30 | ----do---- | Co | Do. |
| 31 | ----do---- | Ni | Do. |
| 32 | acetoacetic acid dibutylamide | Cu | Do. |
| 33 | 1-acetoacetylamino-naphthalene | Cu | Do. |
| 34 | Phenyl-benzoylacetic acid naphthyl-(2)-amide | Cu | Do. |
| 35 | acetoacetyldiphenylamine | Cu | Do. |
| 36 | 1-acetoacetylamino-4-methylbenzene | Cu | Do. |
| 37 | ----do---- | Co | Do. |
| 38 | 1-acetoacetylamino-3-chlorobenzene | Cu | Do. |
| 39 | ----do---- | Ni | Do. |
| 40 | acetoacetic acid ethylamide | Cu | Do. |
| 41 | acetoacetic acid-diethylamide | Cu | Do. |

What I claim is:
1. Complex metal compounds of ortho:ortho'-dihydroxy-monoazo-dyestuffs of the general formula

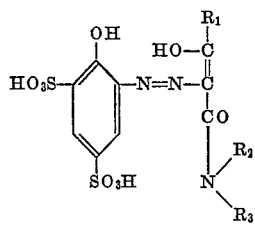

in which $R_1$ represents a member selected from the group consisting of a methyl, phenyl and diphenyl group, $R_2$ represents a member selected from the group consisting of a hydrogen atom, a lower alkyl group and a phenyl group, and $R_3$ represents a member selected from the group consisting of a hydrogen atom, a lower alkyl, cyclo-hexyl, benzyl, phenyl, and naphthyl group, and the groups $R_1$, $R_2$ and $R_3$ are free from sulphonic acid groups, and in which complex metal compounds the metal bound in complex union has an atomic weight of at least 55 and at most 64.

2. Complex copper compounds of ortho:ortho'-dihydroxy-monoazo-dyestuffs of the general formula

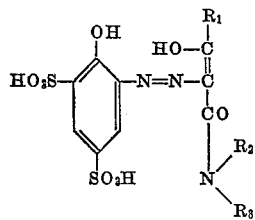

in which $R_1$ represents a member selected from the group consisting of a methyl, phenyl and diphenyl group, $R_2$ represents a member selected from the group consisting of a hydrogen atom, a lower alkyl group and a phenyl group, and $R_3$ represents a member selected from the group consisting of a hydrogen atom, a lower alkyl, cyclohexyl, benzyl, phenyl and naphthyl group, and the groups $R_1$, $R_2$ and $R_3$ are free from sulphonic acid groups, 3. The complex copper compound of ortho:ortho'-dihydroxy-monoazo-dyestuff of the formula

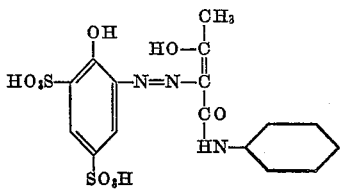

4. The complex copper compound of the ortho:ortho'-dihydroxy-monoazo-dyestuff of the formula

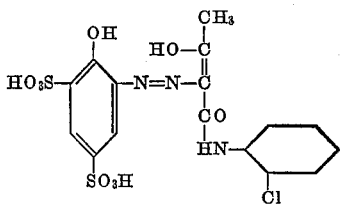

5. The complex copper compound of the ortho:ortho'-dihydroxy-monoazo-dyestuff of the formula

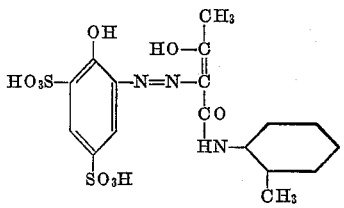

6. The complex copper compound of the ortho:ortho'-dihydroxy-monoazo-dyestuff of the formula

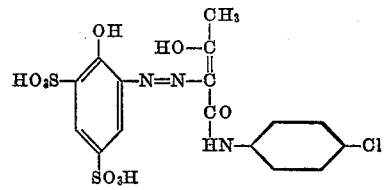

7. The complex copper compound of the ortho:ortho'-dihydroxy-monoazo-dyestuff of the formula

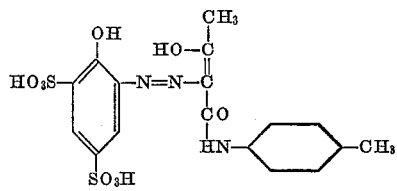

References Cited in the file of this patent
UNITED STATES PATENTS

| | | |
|---|---|---|
| 1,216,812 | Jagerspacher et al. | Feb. 20, 1917 |
| 2,305,095 | Mackenzie | Dec. 15, 1942 |
| 2,727,032 | Buehler et al. | Dec. 13, 1955 |
| 2,734,895 | Zickendraht et al. | Feb. 14, 1956 |

FOREIGN PATENTS

| | | |
|---|---|---|
| 203,335 | Switzerland | June 1, 1939 |
| 953,740 | France | May 23, 1949 |